United States Patent Office 3,326,806
Patented June 20, 1967

3,326,806
NOVEL GERMICIDAL SCRUB SOLUTIONS
George Paul Dolby, Huntington, Ind., assignor to Huntington Laboratories, Inc., Huntington, Ind., a corporation of Indiana
No Drawing. Filed Aug. 10, 1964, Ser. No. 388,700
3 Claims. (Cl. 252—106)

This invention relates to novel pre-operative scrub solutions containing a germicidally effective iodine-ionic surfactant complex plus a second ionic surfactant which does not form a complex with iodine.

During recent years, there has been a revival of interest in iodine as an antiseptic, due mainly to the discovery that iodine can form complexes with a large variety of substances. These complexes slowly release iodine and are thus antiseptic, but the iodine concentration is never high enough to cause skin irritation, or worse. Among the substances which form complexes with iodine and from which iodine can be released in sufficient concentration ot kill bacteria and other minor organisms are: polyvinyl pyrrolidone (U.S. Patent 2,739,922 and others), alkylaryl ethers of polyethylene glycols (U.S. Patent 2,743,208; U.S. Patent 2,931,777 and others), polyalkylene glycols (U.S. Patent 2,599,140), glycine (U.S. Patent 2,385,394), alkylaryl sulfonates (U.S. Patents 2,863,686 and 2,863,-798). It will be noted that a number of these iodine carriers are surface active agents, including both ionic and non-ionic surfactants.

While many of these surface active agents have been useful in forming complexes with iodine, some of them have bound the iodine so tightly that it was not released in sufficient concentration to act as an antiseptic. On the other hand, the most desirable surface active iodine carriers, from the point of view of iodine release, are not the best surfactants as regards lathering ability, dirt removal, non-irritability for skin, etc.

It is an object of the invention to provide, in combination, a complex of iodine with a non-irritating surfactant plus a surfactant which does not complex iodine to any appreciable extent in water solution.

In fulfillment of the above and other objects, this invention provides a pre-operative scrub solution comprising water, iodine, a phosphate ester of an alkylaryl ether of a polyethylene glycol, said phosphate ester being capable of forming a complex with iodine, and an ionic surface active agent which is substantially lacking in the ability to complex iodine. In my novel pre-operative scrub solution, the iodine and the phosphate ester of an alkylaryl ether of a polyethylene glycol are present, and can be provided, in the form of a complex or iodophore. These phosphate esters can be represented by the following formula:

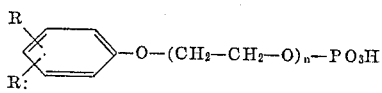

wherein $n$ is an integer from 6 to 50, R is alkyl and R' is alkyl or hydrogen, the total number of carbon atoms of R and R' being from 6 to 18. A preferred embodiment of my invention utilizes an iodine complex with a mixture of phosphate esters of nonyl phenoxy polyethylene glycol according to the above formula in which R' is hydrogen, R is a nonyl group and $n$ is 9 and 10. The following examples more fully illustrate the phosphate esters of alkylphenoxy polyethylene glycols useful as iodine carriers in my novel germicidal pre-operative scrub solutions.

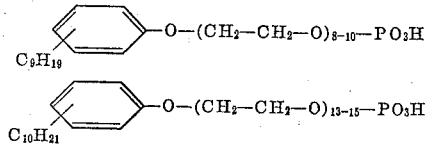

The monophosphate esters usually include some di- and tri-esters, and these are also included within the scope of this invention.

The preparation of phosphate esters of alkyl phenoxy polyethylene glycols is described in U.S. Patents 3,004,056 and 3,004,057.

The iodine complexes with various phosphate esters of alkylphenoxy polyethylene glycols can contain anywhere from 0.1% to 28.5% iodine, and from 0.08% to 24.5% available iodine. The preparation of these iodine complexes is described in U. S. Patent 3,061,506.

The other surface active agent present in my novel pre-operative scrub composition is not an iodine carrier within the usual sense in which that term is employed. The non-carrier surface active agent should have substantially little or no affinity for iodine as compared with a phosphate ester of an alkylphenoxy polyethylene glycol, the iodine carrier employed in my novel composition. The affinity of a substance for iodine can be determined by measuring the dissociation constant for the system—iodine, carrier, and iodine-carrier complex. A suitable group of surface active agents which have a very low affinity for iodine compared with the above phosphate esters are the fatty acid amides of N-(aminoalkyl)-N-(2-hydroxyalkyl) glycines which are usually employed in the form of an alkali metal salt, including such compounds as sodium N-(2-laurylamidoethyl)-N-(2-hydroxyethyl) glycinate, potassium N-(2-stearylamidoethyl)-N-(2-hydroxyethyl) glycinate, sodium N-(2-caprylamidobutyl)-N-(2-hydroxypropyl) glycinate, sodium N-(2-myristylamidoethyl) N-(2-hydroxypropyl) glycinate. The fatty acid forming the amide group should contain from 6–18 carbon atoms. In general, I prefer to use the mixture of fatty acids derived by hydrolysis from coconut oil to furnish the fatty acid amido moiety of the above preferred group of surface active agents. These coconut oil acids, known generically as coco acids contain chiefly stearic and lauric acids. On the average, 90% of the acids are saturated and all occur with the 6–18 carbon atoms range. The mixture of surface active agents derived from the coco acids can be named as N-(2-cocoamidoethyl)-N-(2-hydroxyethyl) glycines and as before, they are employed in the form of their alkali metal salts.

In addition to the iodophore, water and a surface active agent which does not combine with iodine, my novel pre-operative scrub compositions can also contain minor amounts of other ingredients. For example, I have found it advantageous to add small amounts of phosphoric acid to my compositions in order to make the iodine contained therein more readily available. In general, sufficient acid is added to give the disinfectant compositions a pH of 5 or less. Other additives, such as cetyl alcohol, can also be present.

The following are typical pre-operative scrub solutions coming within the scope of this invention:

(I)

204 parts water
60 parts

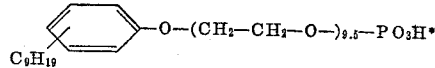

3 parts iodine
80 parts sodium N-(2-cocoamidoethyl)-N-(2-hydroxyethyl) glycinate
4 parts 75% phosphoric acid

*As a mixture of esters in which the number of oxyethylene residue averages about 9.5.

The above composition has a pH=3.6 and 0.78% available iodine. The iodine is added to the composition in the form of a 10% complex with the mixture of phosphate esters of the nonyl phenoxy polyethylene glycols. This complex is prepared according to the procedure of U.S. Patent 3,061,506.

(II)

204 parts water
65 parts

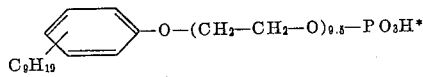

3.5 parts iodine
75 parts sodium N-(2-cocoamidoethyl)-N-2-hydroxyethyl glycinate
4 parts 75% phosphoric acid
2 parts cetyl alcohol
pH=3.2
.89% available iodine

*As a mixture of esters in which the number of oxyethylene residue averages about 9.5.

The iodine is supplied as a 10% iodophore with the mixture of phosphate esters of nonylphenoxy polyethylene glycols.

The following table gives the ranges of ingredients which my novel compositions can contain:

| | |
|---|---|
| Percent iodine ........................percent.. | 0.25–2 |
| Iodophore [1] ............................parts.. | 30–40 |
| Percent iodine in iodophore .........percent.. | 2.5–22 |
| N - (2 - cocoamido) N - (2-hydroxyethyl) glycinate (as the sodium salt) ........parts.. | 70–80 |
| Monophosphate ester of alkylaryloxypolyethylene glycol ........................do.... | 30–40 |
| Water ................................do.... | 200–220 |
| 75% phosphoric ester ...............do.... | 0–4 |
| Other additives .....................do.... | 0–5 |

[1] Complex of iodine with a phosphate ester of alkylaryloxypolyethylene glycol.

Germicidally - active - pre - operative scrub solutions formed in accordance with the above examples have an available iodine concentration close to theoretical, thus showing that the added surface active agent, the N-fatty acid amidoalkyl-N-hydroxyalkyl glycine, does not bind the iodine to any substantial degree. In addition, the combination of surface active agents yields a scrub solution of excellent lathering and dirt and oil solubilization properties. Furthermore, my novel scrub solutions are non-irritating to the skin.

The invention claimed is:

1. A pre-operative scrub solution consisting essentially of from 200 to 220 parts water, from 70–80 parts of a surface active agent selected from the group consisting of the alkali metal salts of an N-(fatty acid amide lower alkyl)-N (hydroxy lower alkyl) glycine wherein said fatty acid has from 6 to 18 carbon atoms, 30–40 parts of a phosphate ester of an alkylaryloxy polyethylene glycol presented by the formula

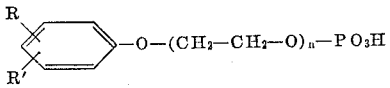

wherein $n$ is an integer from 6 to 50, R is an alkyl and R' is alkyl or hydrogen and wherein the total number of carbon atoms of R and R' is from 6 to 18, iodine in the form of a complex with said phosphate ester of an alkylaryloxypolyethylene glycol and said solution having a pH of 5 or less.

2. A pre-operative scrub solution in accord with claim 1 consisting essentially of from 200–220 parts of water, from 70–80 parts of a surface active agent selected from the group consisting of sodium-N-(2-laurylamidoethyl)-N - (2 - hydroxyethyl) glycinate, potassium-N-(2-stearylamidoethyl)-N-(2-hydroxyethyl) glycinate, sodium-N-(2-caprylamidobutyl)-N-(2-hydroxypropyl) glycinate, sodium N - (2 - myristylamidoethyl)-N-(2-hydroxypropyl) glycinate and sodium-N-(2-cocoamidoethyl)-N-(2-hydrodroxyethyl) glycinate; from 30–40 parts of a monophosphate ester iodine carrier represented by the following formula:

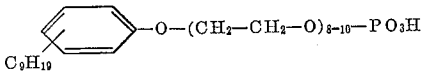

30–40 parts of an iodine complex with said phosphate ester, said iodine being present in said carrier in from 2.5–22% concentration by weight; and 4 parts of 75% phosphoric acid.

3. A pre-operative scrub solution in accord with claim 1 consisting essentially of 204 parts water; 80 parts of N-(2-cocoamidoethyl)-N-(2-hydroxyethyl) glycine as the sodium salt; 30 parts of a monophosphate ester represented by the formula:

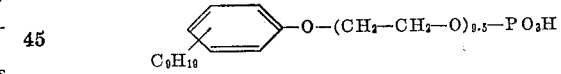

a complex of 30 parts of said phosphate ester with 3 parts of iodine; and 4 parts of 75% phosphoric acid.

References Cited

UNITED STATES PATENTS

| | | | |
|---|---|---|---|
| 1,973,860 | 9/1934 | Ulrich et al. ........ | 260—404 |
| 3,061,506 | 10/1962 | Nunn et al. ......... | 252—106 |

LEON D. ROSDOL, *Primary Examiner.*

ALBERT T. MEYERS, S. E. DARDEN,
*Assistant Examiners.*